April 3, 1962  D. J. BARRY  3,027,601
POLYTETRAFLUOROETHYLENE FILMS AND METHOD FOR MAKING SAME
Filed July 22, 1957  2 Sheets-Sheet 1

INVENTOR
DONALD J. BARRY
Carpenter, Abbott, Coulter & Kinney
ATTORNEYS

United States Patent Office 3,027,601
Patented Apr. 3, 1962

3,027,601
POLYTETRAFLUOROETHYLENE FILMS AND METHOD FOR MAKING SAME
Donald J. Barry, St. Paul, Minn., assignor to Minnesota Mining & Manufacturing Company, St. Paul, Minn., a corporation of Delaware
Filed July 22, 1957, Ser. No. 673,209
8 Claims. (Cl. 18—57)

This invention relates to unfused, strong and handleable polytetrafluoroethylene films and to a method for making the same.

In present manufacturing techniques for forming virgin polytetrafluoroethylene into tape form, it is frequently necessary to trim rough edges of a film so as to form a straight-edged tape. Scrap unsintered polytetrafluoroethylene film fragments resulting from this trimming have heretofore frequently been discarded since they have not been reprocessable according to known techniques into integral calendered films.

One of the objects of this invention, therefore, is to provide a novel method for reprocessing scraps of unsintered polytetrafluoroethylene.

Another object is to provide a novel method for forming unfused, strong and handleable calendered films of polytetrafluoroethylene using unsintered scrap polytetrafluoroethylene film fragments as a starting material.

A further object is to provide the art with a strong unfused calendered film of polytetrafluoroethylene which has a tensile strength in at least one direction of at least 3,500 p.s.i. (ASTM D–1000 test procedure for determining tensile strength was employed.)

Other objects and advantages of this invention will be evident as this description proceeds.

To facilitate understanding and to illustrate particles of polytetrafluoroethylene from which films of this invention are formed by calendering, a drawing is incorporated as part of this disclosure. In the drawing, FIGURES 1 and 2 are photographs taken under 50 power magnification. FIGURE 1 is a photograph of scrap oriented polytetrafluoroethylene in the form of the shredded fibrillous particles formed according to treatment as taught by this invention.

The unique properties of polytetrafluoroethylene have pushed it into prominence in recent years for several uses, particularly electrical and various industrial uses. The material is highly resistant to chemicals and solvents, being inert to most chemicals and solvents in general use. It has a good combination of electrical properties. It is heat resistant, and does not melt in the usual sense of the word. When heated or "sintered" for a period of time above about 620° F., it "fuses" and changes from a polycrystalline type material to an amorphous one. Thereafter it is known to exhibit good mechanical strength, flexibility and toughness, as well as low surface friction characteristics. As a calendered film in the unfused state prior to sintering, however, it has heretofore been relatively brittle and has exhibited relatively weak mechanical properties, yet it has not been possible to separate or break up such a film into small particles of a size on the order of the virgin particles and successfully reprocess these particles into an integral coherent film satisfactorily free of pinholes and the like.

I have found a way not only to reprocess unsintered scrap film fragments of polytetrafluoroethylene into integral mechanically-strong calendered films, but also a way to make unsintered calendered polytetrafluoroethylene films of surprisingly high mechanical strength using scrap particles of oriented polytetrafluoroethylene as the starting material. My preferred unsintered films are so strong in longitudinal direction that they can be wound under tension on storage reels as they emerge from the nip of a forming calender. They are formed using scrap fragments of polytetrafluoroethylene film in which chains of the polymer are largely oriented in one direction. This feature of orientation for the starting material seems to be critical, yet in view of the processing involved as will be explained, it appears highly unusual that oriented scrap must be employed for the greatest advantages of this invention to obtain.

Figure 1:

I will now describe the process by which I accomplish making such films. I first take film scraps of unsintered oriented polytetrafluoroethylene and cut them, e.g., by a disc grinder, to reduce their size so that they at least pass through a screen of about 4 mesh. These particles are then shredded under certain critical conditions to further reduce their size and form particles which have a characteristic fibrillous appearance as illustrated in FIGURE 1. It is imperative that this shredding action in the case of unsintered scrap be conducted under reduced temperature conditions and in a dry solvent-free atmosphere or environment in order for the improved film strengths of this invention to obtain.

In practice I have found the best procedure for shredding to be as follows: The unsintered scrap particles are placed in a machine adapted for fine comminution, a Fitzpatrick comminuting type D grinder, being preferred. This machine in essential respects consists of a screen member and a plurality of elements having a flat segment which passes in close tolerance over the screen member. The screen member is a curved or arced member which is positioned below a shaft from which the elements having a flat segment extend. The flat segments at the extremity of these elements have the same arc of curvature as the screen and, as aforestated, pass over the screen in close tolerance during rotation of the shaft. Particles of polytetrafluoroethylene placed in the chamber surrounding the shaft above the screen member are shredded and torn into small fibrillous particles as they are forced by the flat segments through the holes in the screen. During shredding of the particles of polytetrafluoroethylene by this machine, I maintain the temperature of the particles at a reduced level between about −90° F. and −40° F., by passing into the shredding or comminuting chamber a constant flow of dry gaseous cold carbon dioxide. Suitably, the source of cold carbon dioxide to use can be that obtained by releasing a stream of carbon dioxide gas from a pressurized tank of liquid carbon dioxide held at room temperature. Upon release of $CO_2$ from such a source, it expands within the shredding chamber, reduces the temperature, and produces a pressure therein only slightly above normal environmental pressure conditions. No liquid vehicle is employed in the shredding operation. By employing conditions aforespecified, particles of oriented polytetrafluoroethylene are fractured, shredded and torn into filamentary fragments of a hairy fibrous structure as illustrated in FIGURE 1.

Figure 2:
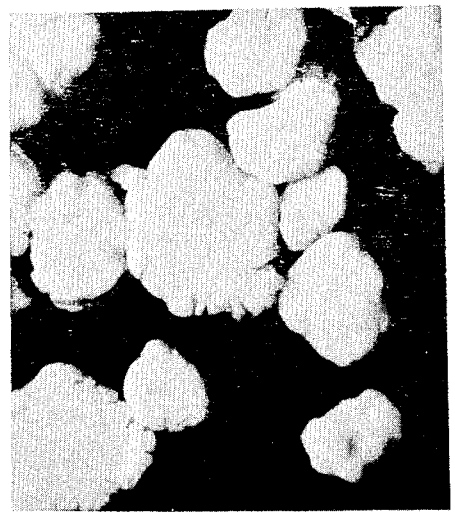
FIGURE 2 is a photograph of virgin polytetrafluoroethylene molding powder recommended for use in forming a film and marketed as "Teflon 1."
Figure 3:
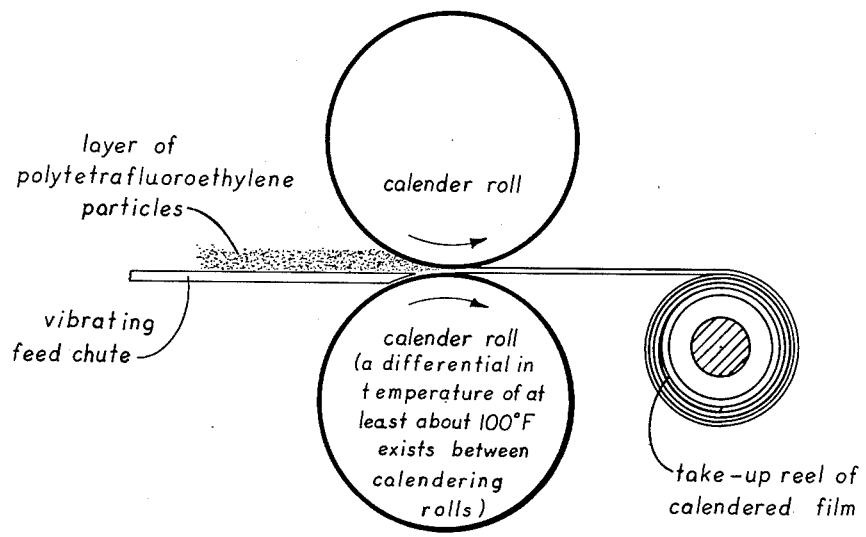
FIGURE 3 is a schematic drawing serving as a flow sheet to illustrate my calendering process.

Size measurements of particles having the configuration of the particles illustrated in FIGURE 1 will readily be seen to be not entirely reliable as a sole criterion of the nature of the resulting shredded particles. These particles, as illustrated, do not even approach the configuration of virgin polytetrafluoroethylene powder particles in the form of spheres or balls such as illustrated in FIGURE 2. Nevertheless, I have found that the size of the resulting particles, as measured by a certain method, is helpful to further designate their particular properties. In measuring size according to this method, I employ the following sedimentation procedure: 550 millimeters of N-butanol is added to 0.5 gram of the polytetrafluoroethylene resin whose particle size is to be determined. This dispersion is stirred and poured into an Andreason Sedimentation Pipette apparatus. On a separate sample of resin, a moisture determination is made; from this, calculation is made to determine the accurate weight of the resin, minus moisture, actually added to the alcohol.

The pipette apparatus is then placed in a constant temperature bath at 25° C. for about 30 minutes after which it is removed and shook by hand for about 2 minutes to be sure that the dispersed particles are well suspended. The exact time that shaking is stopped is recorded and the apparatus is then replaced again in the same bath. A first sample is then taken immediately by drawing 10 ml. up into the pipette bulb at a suitably slow rate of about 20 seconds. This sample is rapidly drained into a weighing vessel, dried, and weighed. The weight of this first sample gives the initial weight of the powder particles taken up into the pipette. Other 10 ml. samples are withdrawn at successive time intervals at the same rate as the first sample. The time at which the samples are withdrawn is recorded along with the dry weight of the powder of the samples.

The particle sizes are calculated using Stokes' law, expressed mathematically as follows:

$$r = \frac{9hn}{2(D_1 - D_2)gt}$$

where, $r$=radius of spherical particles (cm.)
$n$=viscosity of suspending medium (poises)
$h$=standard distance between liquid surface and pipette tip for all samples drawn (cm.)
$D_1$=true specific gravity of particles
$D_2$=true specific gravity of suspending medium
$g$=gravitation constant
$t$=time from start of test (sec.) to completion for each sample.

The results are plotted as a curve with particle size as the abscissa and the percent by weight of resin in each sample withdrawn as the ordinate. From this curve the percent by weight of various particles sizes in the polytetrafluoroethylene resin tested may be obtained, and also the average particle size of the resin tested may be determined.

Using such a technique, the size of particles usable in the practice of this invention should measure to be below 24 microns, and preferably in the range of about 2 to 18 microns.

Shredded dry particles of scrap unsintered polytetrafluoroethylene resulting from the foregoing treatment exhibit some tendency to ball or clump together while standing and settling in a container. They are therefore fluffed so as to separate any clumps; and then the mass is spread as a layer of approximately uniform density and thickness prior to passing it between calender rolls. In practice, I break any clumps or agglomerations of the resulting dry particles of polytetrafluoroethylene by using an agitation type mixer such as a "V-shaped" cone mixer having an intensifier bar; however, other means for agitation and breaking up agglomerations of the fibrous particles may be suitable to employ. A vibrating feed chute having a flat lower surface, e.g., a Syntron vibrator feed unit, is desirable employed to feed the fibrous particles as a fluffy layer of approximately uniform density and thickness to the nip of calender rolls. It is imperative that the particles be fed to the nip of the calender rolls in an approximately uniform layer, as aforementioned, since underfeeding and overfeeding for any particular setting of the calender rolls will cause the film resulting from calendering to have holes. Underfeeding causes pinhole formation whereas overfeeding of a portion of a layer will cause tears as well as large holes or blank spaces to appear in the film.

Calendering of the scrap particles is accomplished at a raised temperature below about 400° F. using polished steel rolls operating at the same surface speed. It is preferably accomplished, to gain the superior results herein taught, while maintaining a differential temperature between the surfaces of the layer within the nip of the calender rolls. Thus, I have found that a temperature differential between the rolls of a calender of at least about 100° F. produces surprising results in terms of the strength and uniformity of a pinhole-free product emerging from the rolls. In practice, I employ a temperature of about 70 to 150° F. for one roll of the calender and a temperature of about 180 to 320° F. for the other. Other differential temperatures outside of these limits, however, may be possible to employ, but it appears from my present experimentation that the general concept of temperature differential is most critical for the formation of my preferred product.

In calendering polytetrafluoroethylene according to this invention, it is unnecessary to employ a calender having the axes of its rolls mounted in the same horizontal plane, as taught in polytetrafluoroethylene prior art. Instead, conventional mountings for the rolls of a calender, with the axis of each horizontal roll in a single vertical plane, are possible to employ in the practice of this invention, and are preferred.

Compact, dense films of polytetrafluoroethylene having, in longitudinal direction, a tensile strength of at least about 3,500 p.s.i., and an elongation of at least 10% of their length at breakage, are readily formed by my process. In transverse direction, films formed as herein described from unsintered scrap polytetrafluoroethylene particles are relatively weaker in tensile strength. However, transverse tensiles at least above about 650 p.s.i. and up to about 1,000 p.s.i. are ordinarily obtained, in combination with elongation properties, in transverse direction, of at least 5% at breakage. The combination of properties exhibited by the films formed according to this invention render them both flexible and strong. They are so strong that they can easily be handled in manufacturing processes without the necessity of sintering them as they emerge from the rolls of a calender. They may be flexed without fracturing and may be wound under considerable tension upon storage rolls or reels as they emerge from the nip of a calender. Unsintered calendered films of virgin globulate particles of polytetrafluoroethylene, on the other hand, are of weak tensile strength, generally below about 2,500 p.s.i. in longitudinal direction. In transverse directions, these prior art, unsintered calendered films of polytetrafluoroethylene have shown only negligible tensile strength properties, such tensiles being difficult to measure and being at least well below 650 p.s.i. Such films are brittle and readily crack or fracture upon flexing.

As an alternative to rolling my unsintered films on a storage reel, they may, as is well known in the art, be given a sintering treatment immediately as they emerge from the calender. A particular advantage of my process, however, is that the calendered film so formed possesses sufficient strength to permit of omitting the sintering operation such as ordinarily performed upon virgin powder immediately as it emerges from the nip of calender rolls. Immediate sintering of calendered polytetrafluoroethylene particles is therefore no longer a required method of treatment. Thus, the interdependency of a suitably operating calender operation and a suitably operating apparatus for sintering is no longer a limitation in the process of calendering polytetrafluoroethylene particles into films as a result of the teaching of this invention.

The following examples are offered to further illustrate the features of this invention, but are not to be construed as limitative.

Example 1

The particular polytetrafluoroethylene particles used as the starting material for the product of this example were scrap particles from a film formed as follows: A blended mix comprising virgin polytetrafluoroethylene, and, based on 100 parts of polytetrafluoroethylene, about 3 parts of chromium oxide as a color pigment, and about 8–12% deodorized kerosene oil as a lubricant was pressure extruded as a 40–50 mil thick layer through an orifice. This caused a substantial amount of orientation of the long molecules of polytetrafluoroethylene in a longitudinal direction within the layer. The extruded layer was then calendered several times to reduce its thickness to about 4 or 5 mils and effect further stretching and alignment of the chains of the polymer in longitudinal direction within the layer. The resulting film was soaked in organic solvent (trichloroethylene) so as to dissolve out the lubricant, and then dried and trimmed. This product is currently produced on a large scale and enjoys a ready market.

Scrap particles from the foregoing process are unsintered and contain polytetrafluoroethylene chains in substantial alignment, i.e., orientation. These scrap film fragments were cut at room temperature into small particles on the order of ⅛" to ¼" in size using a disc grinder.

The cut scrap was fed into a Fitzpatrick comminuting machine type D, as aforedescribed, employing a screen having a hole size of about .020 inch in diameter and about 900 holes per square inch of screen surface. This machine was operated at high speed with its shaft rotating at about 8,000 revolutions per minute. Carbon dioxide gas from a source as aforedescribed was fed into the shredding chamber during operation to maintain the temperature between about −90° F. and −40° F.

Particles resulting from this shredding treatment varied in size but averaged to be about 3 to 4 microns in size according to the aforenoted sedimentation test method.

These particles were fluffed in a dry state by tumbling them in a mixer having an intensifier bar for about one minute. They were then fed onto a vibrating feeder tray (e.g., a Syntron vibrator apparatus), where they were vibrated into a uniformly thick layer, which in turn was fed to the nip of calender rolls.

The top horizontal roll of the calender was held at about 250° F. to 270° F., and the bottom horizontal roll at about 80° F. to 90° F. The layer of fluffed fibrous particles of polytetrafluoroethylene was fed between these spaced rolls at a speed so as to form a compact, dense, calendered film about 3 mils thick at the rate of about 20 feet per minute. As the film emerged from the nip of the rolls of the calender, it was wound under tension on a 3 inch diameter core. This film had a longitudinal tensile strength of 4,800 p.s.i. at break, and an elongation of about 25% at break. In transverse direction, it had a tensile of about 800 p.s.i. and an elongation of about 10% at break.

The film may be slit and used as an unsintered tape, or it may first be sintered by, for example, passing it under substantially zero tension through a salt bath at about 690–710° F. In sintering, the film expanded to a thickness of about 4.5 to 5.5 mils and, as a sintered product, had a tensile strength in longitudinal direction at break of 7,000 p.s.i. with 75% elongation. In transverse direction, the sintered film showed a tensile of 2,000 p.s.i. and an elongation of 400% at break.

Example 2

The same conditions and materials as employed in Example 1 were used in the preparation of the product of this example, except that the size of the holes of the screen of the Fitzpatrick comminutor was .024 inch in diameter for this example, giving shredded particles of oriented polytetrafluoroethylene of various sizes but averaging about 14 to 15 microns as measured by the aforementioned sedimentation procedure.

The calendered film of this example was compact and dense. In the unsintered state it was about 3 mils thick and gave a longitudinal tensile strength reading of 4,000 p.s.i. at break, with 25% elongation. In transverse direction its tensile was about 800 p.s.i. and elongation about 15%.

Sintering of this film by passing it through a salt bath at about 690–710° F. caused the film to expand to about 5 mils average thickness. Its longitudinal tensile in sintered form was about 7,000 p.s.i. and its elongation about 75% at break, whereas its transverse tensile was about 2,000 p.s.i. and about 400% elongation at break.

As illustrated in the foregoing examples, the films of this invention consist essentially of polytetrafluoroethylene. Where desired, coloring pigments and various fillers of a particle size small enough to pass a 325 mesh screen may be employed as constituents of the film; however, such ingredients should not be employed in an amount greater than about 15 percent by weight of the film mass where it is desired to obtain unsintered films possessing the greatly improved strength characteristics as aforedescribed.

It will be understood that the method described herein may be utilized in the processing of polytetrafluoroethylene particles other than oriented polytetrafluoroethylene scrap; and in this respect, the scope of this invention is not to be limited solely to the specific starting materials set forth in the foregoing illustrative examples.

Also, polymeric materials which are similar in behavior to polytetrafluoroethylene, and which therefore are to be considered the equivalent of polytetrafluoroethylene may be utilized in the practice of this invention. Thus while the invention finds particular utility and is primarily directed to scrap polytetrafluoroethylene materials having a chemical composition as illustrated in U.S. Patents 2,230,654, and 2,393,967, it is also useful in the processing of equivalent materials such as those described as equivalents in U.S. Patent 2,586,357.

Those skilled in the art of processing virgin polytetrafluoroethylene particles into calendered films will also realize that my process may be varied in certain non-critical respects from the procedure set forth herein, while still retaining the essence of the procedure hereof; and in this respect, the foregoing is not to be construed as limitative.

That which is claimed is:

1. A method of making a tough, calendered, unfused film consisting essentially of polytetrafluoroethylene, said film having a tensile strength in at least one direction of at least 3,500 p.s.i., said method comprising feeding fibrillous hairy particles of polytetrafluoroethylene as a fluffy loose substantially uniformly thick layer to the nip of calender rolls, said particles being of a size not greater than about 24 microns, as determined by sedimentation test measurement, and calendering said particles of polytetrafluoroethylene at raised non-sintering temperatures below 400° F. into a compact dense unsintered film having a high degree of tensile strength in longitudinal direction, said calendering being conducted while maintaining one calender roll in contact with one surface of said film at a temperature at least about 100° F. above the temperature of another calender roll in contact with the opposite surface of said film.

2. A method of making a tough, calendered, unfused film consisting essentially of polytetrafluoroethylene, said film having a tensile strength in at least one direction of at least 3,500 p.s.i. and an elongation in said direction of at least 10% at breakage, said method comprising feeding fibrillous particles of polytetrafluoroethylene as a fluffy loose substantially uniformly thick layer to the nip of calender rolls, said particles being of a size not greater than about 24 microns, as determined by sedimentation test measurement, and calendering said particles of polytetrafluoroethylene at raised non-sintering temperatures below 400° F. into a compact dense unsintered film having a high degree of tensile strength in longitudinal direction by passing said layer between calender rolls, one roll of said calender in contact with said film being maintained at a temperature between 70 and 150° F. and the other roll of said calender in contact with the opposite surface of said film being maintained at a temperature between about 180 and 320° F., and at least about 100° F. above the temperature of said one roll.

3. A method of making a tough, calendered, unfused film consisting essentially of polytetrafluoroethylene having a tensile strength in one direction of at least 3,500 p.s.i. and an elongation in said direction of at least 10% at breakage, said unfused film having a tensile strength in a direction transverse to said one direction between 650 and 1,000 p.s.i. with an elongation in said transverse direction of at least 5% at break, said method comprising (1) comminuting particles of unsintered oriented polytetrafluoroethylene in a dry environment under a reduced temperature by tearing and shredding said stiff particles until said polytetrafluoroethylene has been reduced to a particle size between about 2 and 18 microns, as determined by sedimentation measurement, said reduced particles of polytetrafluoroethylene being filamentary fragments of a hairy fibrillous appearance under 50× magnification, (2) feeding these particles of polytetrafluoroethylene as a fluffy loose substantially uniformly thick layer to the nip of calender rolls, and (3) calendering said particles of polytetrafluoroethylene at raised non-sintering temperature below 400° F. into a compact dense unsintered film having a high degree of tensile strength in longitudinal direction, said calendering being conducted while maintaining one calender roll in contact with one surface of said film at a temperature at least about 100° F. above the temperature of another calender roll in contact with the opposite surface of said film.

4. A method of making a tough, calendered, unfused film consisting essentially of polytetrafluoroethylene comprising feeding small fibrillous particles of polytetrafluoroethylene of a size below 24 microns, as determined by sedimentation test measurement, in a substantially uniformly thick layer to the nip of calender rolls, and calendering said particles at a raised non-sintering temperature below 400° F. into a compact dense unsintered film by passing said layer of particles between calender rolls while maintaining one calender roll in contact with one surface of said film at a temperature at least about 100° F. above the temperature of another calender roll in contact with the opposite surface of said film.

5. As a new article of manufacture: a thin, unfused, unsintered, flexible, dense film of cohering particles of polytetrafluoroethylene having a tensile strength of at least 3,500 p.s.i. in at least one direction and a tensile strength of between 650 and 1,000 p.s.i. in a direction transverse to said one direction, said film being formed by passing fibrillous particles of tetrafluoroethylene of a size below 24 microns, as determined by sedimentation test measurement, in a substantially uniformly thick layer between calender rolls at a raised non-sintering temperature below 400° F. while maintaining one calender roll in contact with one surface of said layer at a temperature at least about 100° F. above the temperature of another calender roll in contact with the opposite surface of said layer.

6. As a new article of manufacture: a thin, unfused, flexible, dense film of cohering particles of polytetrafluoroethylene having a tensile strength in at least one direction of at least 3,500 p.s.i. with at least 10% elongation at break in said direction, said film being formed by the process of claim 1.

7. The article formed by the process of claim 3.

8. A method of making a tough, calendered, unfused film consisting essentially of polytetrafluoroethylene, comprising feeding fibrillous particles of polytetrafluoroethylene as a fluffy loose substantially uniformly thick layer to the nip of calender rolls, said particles being of a size not greater than about 24 microns, as determined by sedimentation measurement, and calendering said particles at a raised non-sintering temperature below 400° F. into a compact dense unsintered film by passing said layer of particles between calender rolls operating at the same surface speed while maintaining one calender roll in contact with one surface of said film at a temperature at least about 100° F. above the temperature of another calender roll in contact with the opposite surface of said film.

References Cited in the file of this patent

UNITED STATES PATENTS

| | | |
|---|---|---|
| 2,406,127 | Alfthan | Aug. 20, 1946 |
| 2,419,010 | Coffman et al. | Apr. 15, 1947 |
| 2,440,190 | Alfthan | Apr. 20, 1948 |
| 2,496,978 | Berry | Feb. 7, 1950 |
| 2,578,522 | Edgar | Dec. 11, 1951 |
| 2,578,523 | Llewellyn et al. | Dec. 11, 1951 |
| 2,586,357 | Llewellyn et al. | Feb. 19, 1952 |
| 2,613,203 | Myers | Oct. 7, 1952 |
| 2,631,954 | Bright | Mar. 17, 1953 |
| 2,879,547 | Morris | Mar. 31, 1959 |
| 2,936,301 | Thomas et al. | May 10, 1960 |